UNITED STATES PATENT OFFICE.

HANS von SCHÖNTHAN, OF SCHÖNEBERG, NEAR BERLIN, GERMANY, ASSIGNOR TO THE FIRM OF VEREINIGTE CHEMISCHE WERKE AKTIENGESELLSCHAFT, OF CHARLOTTENBURG, NEAR BERLIN, GERMANY.

PROCESS FOR DISSOCIATING FATS, OILS, AND WAXES.

1,058,633.  Specification of Letters Patent.  Patented Apr. 8, 1913.

No Drawing.  Application filed January 26, 1912.  Serial No. 673,676.

*To all whom it may concern:*

Be it known that I, HANS VON SCHÖNTHAN, chemist, a subject of the Austro-Hungarian Emperor, residing at 3 Innsbrucker street, Schöneberg, near Berlin, Kingdom of Prussia, German Empire, have invented a new and useful Improvement in Processes for Dissociating Fats, Oils, and Waxes; and I do hereby declare the following to be a full, clear, and exact description of the same.

This invention relates to an improved process for splitting up fats, oils and waxes into their components, *i. e.* the fatty acid and the alcohol. In such an operation one known process, which may be called the Twitchell process, and is described in the Patent 601603 has depended upon the aid of so called aromatic sulfonated fatty acids, the process having hitherto been carried out by using, as the agent for causing the decomposition of the fats an aromatic sulfonated derivative of unsaturated fatty acids, for instance commercial oleic acid. Although with this dissociating agent it was possible to decompose the fat or oil fairly completely in a quantitative sense, a serious drawback was experienced in connection with the working up of the recovered fatty acids in soap making, owing to the color of the fatty acids being too dark. The recovered fatty acids are, in any case, considerably darker than the oil or fat used as raw material. In order to lessen this defect as far as possible, very small quantities of the dissociating agent were used; but in no case has it been possible by this means to obviate the said drawback completely. There was also the additional disadvantage that the operation of splitting up the fats took a considerable time to perform and in order to shorten the process of dissociation it was necessary to use a much larger quantity of the dissociating agent. This, however, increased the coloration—which had already been considerable and undesirable—of the fatty acids to such an extent as to render a supplementary treatment of the fatty acids, by distillation or the like, indispensable. Hence, the technical conditions in the performance of the Twitchell process were such that the use of the dissociating agent, mainly obtained from unsaturated fatty acids or fats hitherto employed, either entailed an excessive consumption of time for the dissociation or else yielded fatty acids too dark in color. I have, however, now made the surprising observation that fatty acids much lighter in color can be obtained, even with the use of larger quantities of the dissociating agent and the consequent possibility of accelerating the dissociation process, by using, in place of the derivatives of unsaturated fatty acids previously employed for the preparation of the dissociating agent, fatty acids or fats which have been subjected to a process of reduction previously to the preparation of the dissociating agent by the action of sulfuric acid on the fatty compound and an aromatic compound no matter whether these fatty acids or fats are mainly unsaturated, or whether they contain only small quantities of unsaturated fatty acids and fats. By treating the fatty acids or fats with hydrogen the unsaturated compounds are converted into the saturated form, further molecular transformations being also effected in many cases.

As reducing process, use may especially be made of the methods in which the hydrogen is furnished by using a catalyzer. There are also other reduction processes, for example, electrolytic processes, that can be used. Very favorable results are furnished by the fatty acids obtained by the action of hydrogen according to the methods described in the British specifications 1,515 of 1903, No. 5,188 of 1911, 30,282 of 1910, namely, by using finely divided platinum metals (for instance, palladium or platinum, or the protohydroxids of same) precipitated on substances, such as metals, salts, wood flour or the like, which have no anti-catalytic action. The reduction is preferably carried to such an extent that the iodin value is *nil* or practically so. The dissociating agents are then prepared from the fats or fatty acids that have been modified in this way. In carrying out the dissociation of the fats with the dissociating agents so obtained, fatty acids are recovered that are extremely pure and are particularly distinguished by their pale color which is specially suitable for the manufacture of soap. Even when large quantities of the dissociating agent are used the fatty acids obtained are far paler in color than those recovered by the aid of dissociating agents from untreated fats or fatty acids. At the same time the advantage is secured that the dissociation is considerably accelerated, because much more (about twice as much) of the dissociating agent, can be used than heretofore, and thereby the dissociation process is appreciably shortened. In all cases the recovered fatty acids are exceedingly light in color, the color of the raw material being completely, or almost completely, unchanged. Moreover, the glycerin obtained by using sulfo-aromatic dissociating agents from reduced fatty acids or fats is considerably clearer and paler than when dissociating agents, prepared from ordinary sulfo-aromatic fatty acids, are employed. Consequently the glycerin recovered can be purified in a considerably simpler and cheaper manner.

The dissociating agent is prepared, for example, in the following manner: 100 parts by weight of castor oil are reduced by, for instance, the Paal process described in the British Patent 5,188 of 1911. The product of the said reduction process is ground to a fine powder with 100 parts of naphthalene, and the mixture is introduced by degrees—with stirring—into 400 parts of sulfuric acid of 66° strength. The temperature should not exceed about 20° C. during this process. Stirring is continued until a uniform solution is obtained, whereupon the whole mass is introduced into 800 parts of water at room temperature and well stirred. Two layers soon form, the lower one—which represents sulfuric acid of about 33% strength—being removed, while the upper layer—which is freed from inactive constituents, if necessary, by filtration—forms the dissociating agent.

The dissociation itself is effected, for example, in the following manner: 1000 parts by weight of palm kernel oil are mixed with 300 parts of water and 2 parts of the above described dissociating agent, dry steam being then introduced into the mass. After from 6 to 8 hours the steam is shut off and the dissociation is technically complete. The mixture is then left at rest and, if necessary, small quantities of dilute sulfuric acid are added, for the purpose of separating the initially very homogeneous emulsion. Two layers are formed, with a clear, reflecting plane of separation, the lower layer representing the glycerin liquor, which can be concentrated direct by known methods after the removal of the sulfuric acid, while the upper layer consists of the separated fatty acids of the fat or oil.

I claim:—

1. The process for splitting up fats, oils or waxes into the corresponding acids and alcohols which consists in subjecting unsaturated fats or fatty acids to a reduction process, mixing the reduced fats or fatty acids with an aromatic compound, causing sulfuric acid to act on the mixture, separating the product of the said reaction and heating the fats to be split up with the said dissociating agent.

2. The process for splitting up fats, oils or waxes into the corresponding acids and alcohols which consists in subjecting fats or acids of the ricinolic series to a reduction process until the iodin-addition number becomes nearly to zero, mixing the reduced fats or fatty acids with an aromatic compound, causing sulfuric acid to act on the mixture, separating the product of the said reaction, and heating the fats to be split up with the said dissociating agent.

In testimony whereof, I have signed my name to this specification in the presence of two subscribing witnesses.

HANS von SCHÖNTHAN.

Witnesses:
 WOLDEMAR HAUPT,
 HENRY HASPER.